UNITED STATES PATENT OFFICE.

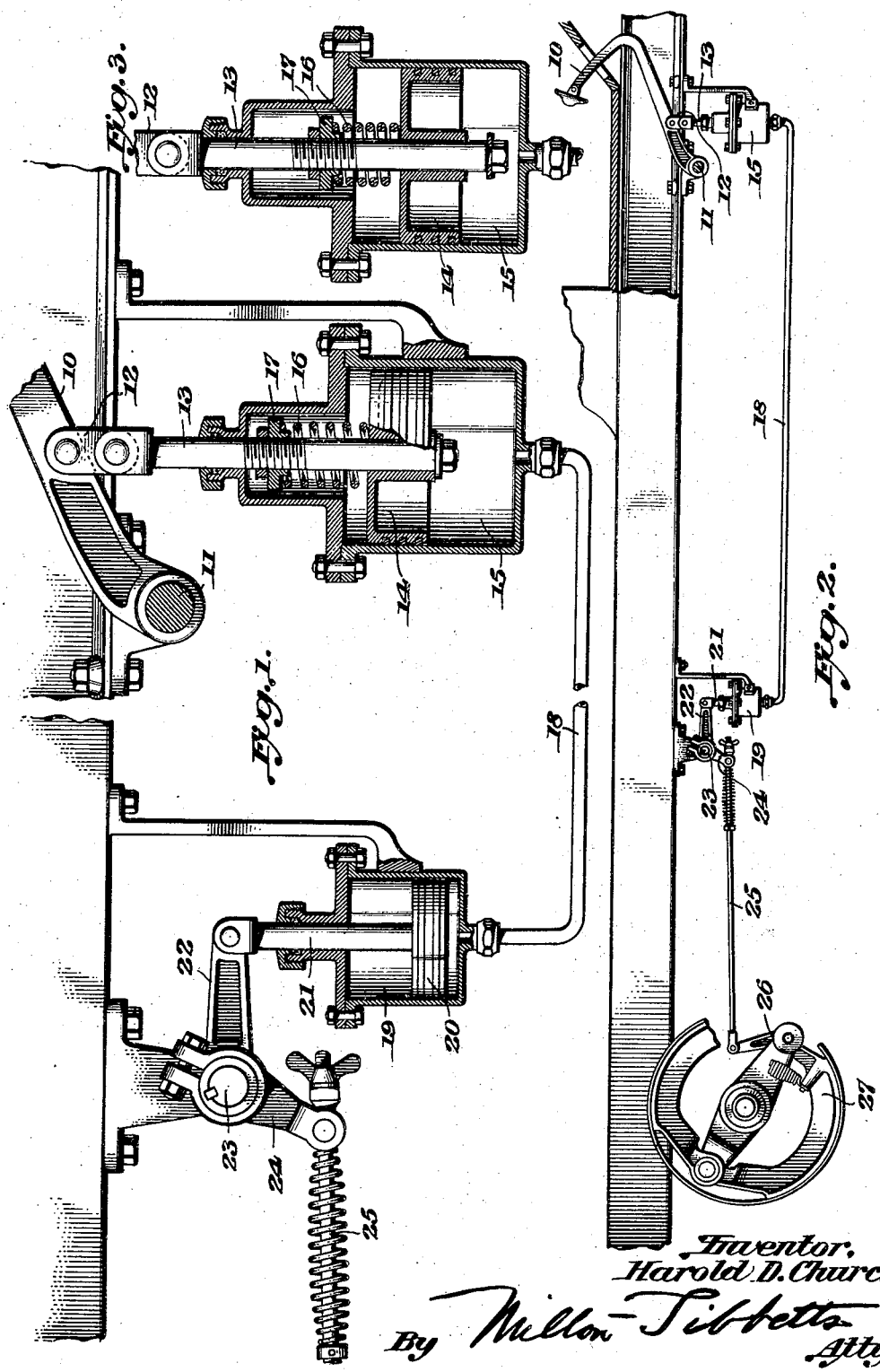

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,369,915.

Specification of Letters Patent.

Patented Mar. 1, 1921.

Application filed January 13, 1919. Serial No. 270,974.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles. It has particular relation to hydraulic brakes for such vehicles.

One object of the invention is to provide a brake of effective construction capable of producing a powerful pressure under a stroke of the usual length applied to the brake pedal.

Another object of the invention is to provide a brake in which the first part of the movement of the brake pedal or other operating member is relatively rapid so as to quickly take up the clearances between the various brake parts, and in which increased power may be obtained during the remainder of the movement of the operating member.

Another object of the invention is to provide a construction obtaining the above relatively quick initial movement of the brake pedal and the slower movement and relatively greater power during the latter part of the pedal stroke, in which the respective parts accomplishing this differential action are embodied in a power element of simple construction.

Another object of the invention is to generally improve the construction and operation of mechanisms of the above class.

The invention is embodied in preferable form in the construction and arrangement hereinafter described and illustrated in the accompanying drawings.

In these drawings—

Figure 1 is a vertical sectional view showing the hydraulic power elements of the braking mechanism; and Fig. 2 is a side elevation showing said elements applied to a motor vehicle in connection with a brake, and the connected parts between said brake and the power elements.

Fig. 3 is a section of the large power cylinder showing the pistons in brake operating position.

Referring to the drawings—10 indicates a brake pedal or other operating member to which power may be applied to effect the operation of the power increasing elements intermediate said member and the brakes. This brake pedal is pivoted at 11 and is pivotally connected by a link 12 with a rod 13 which constitutes in itself a piston adapted to displace and create a pressure upon the fluid constituting the power transmitting medium. 13 also constitutes a piston rod for a main piston. This main piston is indicated by 14 and is capable of reciprocating movement independently of the combined rod and piston member 13. These two pistons are movable in a cylinder 15 which is filled with oil or other liquid and with which said pistons coöperate to form the main power increasing element.

A spring 16 is mounted on the piston rod 13 between one face of the piston 14 and a nut 17 threaded on said rod 13.

In the inward movement of the member 13 under the pressure applied thereto by the pedal, the pressure will be transmitted through the spring 16 so as to cause the main piston 14 to be also moved inward conjointly with the member 13 until the resistance due to the increasing friction of the brake parts and the opposing pressure of the fluid is greater than the force of the spring 16 whereupon the pressure of the spring against the nut on the rod 13 will be overcome and member 13 will move forward against the fluid independently of the piston 14.

The outer end of the cylinder 15 communicates by conduit 18 with a secondary hydraulic power element comprising a cylinder 19 in which a piston 20 is mounted for reciprocation and so as to receive pressure from the incoming fluid. The piston 20 is of less cross sectional area than the piston 14 but of greater cross sectional area than the piston member 13. The piston 20 is carried by rod 21, the outer end of which is pivoted to an arm 22 which is fixed on a rocking shaft 23, from which project arms 24 to which are pivoted brake rods 25 carrying at their ends suitable operating members 26 for brakes 27.

In the operation of the device, when pressure is applied to the pedal or similar operating member, the piston 13 will be carried inward and owing to the pressure thereof against the spring 13 the main piston 14 will also be carried in the same direction conjointly with the member 13 and the pressure will be transmitted through the fluid against the pressure receiving piston 20 in the cylinder 19. Owing to the fact that the cross sectional area of the piston 14 is greater than that of the piston 20 the latter will be caused to move with a relatively greater velocity, thus effecting a comparatively quick movement of the parts connected to the brake, and thus serving to quickly take up the clearances between these parts. As the resistance increases the operation of the power applying element 14 has a tendency to be slowed up and thereupon the pressure of the spring between the piston 14 and piston 13 being overcome, the latter piston will be moved forward independently of piston 14 and transmit further pressure to the fluid, such pressure being increased in force by the relatively greater area of the pressure receiving piston 20 with respect to said piston 13.

Having thus described my invention, what I claim and desire to secure by Letters Patent is:

1. In combination with a brake for motor vehicles, foot or hand controlled actuating means, a hydraulic power line between said actuating means and said brake, including a pair of cylinders of different cross areas and a piston element of differential area in one of said cylinders adapted to vary in respect to its moving face as the resistance in the line increases from a large area to a smaller area, and the means of direct communication between the two cylinders.

2. In combination with a brake for motor vehicles, operating means therefor, foot or hand controlled actuating means, a hydraulic power line including a pair of cylinders to direct communication between said operating means and said brake, and a differential hydraulic power applying piston in said line operable with a rapid initial movement and a succeeding heavy pressure movement.

3. In combination with a brake for motor vehicles, an operating member, a hydraulic power element between said parts having a fluid containing cylinder and a piston therein, and a piston rod movable independently of the piston and connections between said rod and member and a second cylinder having direct communication with the first cylinder and having a piston therein.

4. In combination with a brake for motor vehicles, a foot or hand controlled operating member, a fluid containing cylinder, a piston therein, a piston rod movable relatively to the piston, connections between the rod and member, and yielding means interposed between the rod and piston in the line of relative movement thereof, and a second cylinder and piston having communication with the first cylinder.

5. In combination with a brake for motor vehicles, an operating member, a fluid containing cylinder, a piston therein, a supplemental piston of less cross sectional area movable relatively to the first piston, means to cause said pistons to move together on the operation of said member, and permitting the relative movement of said pistons when a predetermined resistance is encountered by the main piston, and means of connection between the smaller piston and the operating member.

6. In combination with a brake for motor vehicles, an operating member, a fluid containing cylinder between the brake and said member, a piston movable therein, a smaller piston in said cylinder capable of movement relatively to the first piston and constituting a piston rod for the latter, a spring between a part of the piston rod and said larger piston and operating connections for the brakes subject to the pressure in the fluid cylinder.

7. In combination with a brake for motor vehicles, an operating member, a fluid containing cylinder, a fluid line, a pressure transmitting piston in said cylinder, a second cylinder with a pressure receiving piston, and means of communication between the second piston and the brake, a supplemental piston mounted in the first cylinder and movable relatively thereto, and of less cross sectional area than either of the other pistons, means of connection between said supplemental piston and said operating member and means to move said first piston by said supplemental piston, said means permitting a relative movement of said pistons upon resistance to the main piston of a predetermined amount.

In testimony whereof I affix my signature.

HAROLD D. CHURCH.

Correction in Letters Patent No. 1,369,915.

It is hereby certified that in Letters Patent No. 1,369,915, granted March 1, 1921, upon the application of Harold D. Church, of Detroit, Michigan, for an improvement in "Motor-Vehicles," an error appears in the printed specification requiring correction as follows: Page 2, line 41, claim 2, for the word "to" read *in;* and that the said Letters Patent should be read with this correction therein that the same may conform to the record of the case in the Patent Office.

Signed and sealed this 12th day of April, A. D., 1921.

[SEAL.]

T. E. ROBERTSON,
*Commissioner of Patents.*

Cl. 188—152.